United States Patent
Becker et al.

(10) Patent No.: US 6,216,428 B1
(45) Date of Patent: Apr. 17, 2001

(54) SHEARING STALK ROLL SET AND METHOD OF HARVESTING CORN

(75) Inventors: Aaron T. Becker, Cambridge; Steven T. Rieck, Moline, both of IL (US); Heath McCormick, Bettendorf, IA (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/364,745

(22) Filed: Jul. 30, 1999

(51) Int. Cl.[7] ................................................. A01D 45/02
(52) U.S. Cl. ................................................................. 56/104
(58) Field of Search ............................... 56/104, 105, 51, 56/52, 62, 109, 110

(56) References Cited

U.S. PATENT DOCUMENTS

| | | |
|---|---|---|
| 1,188,084 | 6/1916 | Kreitzer . |
| 1,493,626 | 5/1924 | Gebhardt et al. . |
| 2,469,687 | 5/1949 | Fergason . |
| 2,538,965 | 1/1951 | Fergason . |
| 2,604,750 | 7/1952 | Fergason . |
| 3,100,491 | 8/1963 | Dillon . |
| 3,101,720 | 8/1963 | Karlsson . |
| 3,340,702 | 9/1967 | Ditchburn et al. . |
| 3,606,743 | 9/1971 | Johnson . |
| 3,707,833 | 1/1973 | Sutton ..................................... 56/104 |
| 4,233,804 | 11/1980 | Fischer et la. .......................... 56/104 |
| 4,238,916 | 12/1980 | Kesl et al. .......................... 56/104 X |
| 4,845,930 | 7/1989 | Dow ....................................... 56/113 |
| 4,974,402 | 12/1990 | Ostrup et al. ........................... 56/102 |
| 5,009,061 | 4/1991 | Heuling .................................. 56/104 |
| 5,040,361 | 8/1991 | Briesemeister ..................... 56/104 X |
| 5,404,699 | 4/1995 | Christensen et al. .................. 56/104 |
| 5,787,696 | * 8/1998 | Wiegert et al. ........................ 56/104 |
| 6,050,071 | * 4/2000 | Bich et al. .......................... 56/104 X |

* cited by examiner

Primary Examiner—Christopher J. Novodsad
(74) Attorney, Agent, or Firm—Richard G. Lione; Brinks Hofer Gilson & Lione

(57) ABSTRACT

A stalk roll set for a corn-harvesting combine includes first and second rolls adjacent one another, each having an axis of rotation and defining a shear zone therebetween. At least one pair of flutes projecting radially from each roll. The pair of flutes being bilaterally symmetrical and each including a knife edge with a leading surface and a trailing surface forming an acute angle therebetween, whereby the flutes of the adjoining stalk rolls are offset to and overlapping one another.

13 Claims, 3 Drawing Sheets

SHEARING STALK ROLL SET AND METHOD OF HARVESTING CORN

FIELD OF THE INVENTION

This invention relates generally to a corn-harvesting agricultural combine. It relates particularly to the stalk rolls in a corn harvesting header assembly.

BACKGROUND OF THE INVENTION

Corn harvesting combines utilize one or more roll or row units positioned in front of the combine with each unit engaging a row of corn stalks as the combine moves forward. Each unit has a pair or set of counter-rotating and cooperating stalk rolls with outwardly extending blades or flutes that grip the corn stalks therebetween and pull the stalks downwardly. The flutes grip and pull the stalk downwardly through the rolls until the ear of corn strikes against plates positioned above and adjacent the stalk rolls, thereby separating the ear from the stalk. If the stalk is severed prior to the ear striking the plates, the stalk and ear will both fall into the combine, which reduces combine capacity. Once the ear strikes the plates and is removed from the stalk, the stalk is pushed downwardly toward the ground by the rolls and dropped in the field to eventually dry out and decompose.

Ideally, the stalks are discarded in the wake of the combine. The discarded stalks may be chopped up before new plowing or seeding can be done. Increased chopping action advantageously provides for faster decomposition, easier tillage and better insect control. Furthermore, residue cover, as typically measured, would increase with the stalk being cut into more pieces. It is desirable, therefore, that the stalk undergo as much breakage and mutilation as possible during combining. Previous rolls have been ineffective in adequately breaking up the stalk residue and the farmer must make repeated passes with disks and shredders to mutilate the stalks in order to prepare the field for plowing.

Since the invention of the corn-harvesting combine, many stalk roll designs have been developed. Most designs only work satisfactorily when the combine moves at slow ground speeds with moderately dry corn and under reasonably dry field and weather conditions. As ground speed is increased the performance of conventional stalk rolls significantly deteriorates with increasing numbers of stalks severed before ear removal.

Furthermore, corn harvesting is often done late in the growing season just before freezing and at a time when the weather is unpredictable at best. Frequently the crop is wet from rain. The muddy field and cool temperatures allow little chance of rapid drying. As a result the farmer must harvest his crop within a short time interval or risk loss or deterioration of the crop due to worsening weather. When time is short, it may be necessary to harvest in the rain and at high speed.

Also, different varieties of corn affect stalk roll performance. For example, moisture content, stalk thickness, ear size, ear placement and fiber consistency of the stalk, may help or hinder stalk roll operation. Specifically, corn crops like sweet corn are harvested when the stalks are still green and contain high levels of moisture. Such stalks are far more prone to slip during stalk engagement than are dry stalks.

Most stalk rolls have a central, one-piece cylindrical steel core and outwardly extending flutes attached thereto. Some designs have plates with bilaterally symmetrical flutes extending from lateral ends thereof, which detachably engage the cylindrical core. This design, while having the benefit of detachable plates, is not considered aggressive under wet crop conditions from either a stalk gripping or a stalk-mutilating standpoint. More specifically, the flutes lack knife-edges and the edges do not overlap. Other more aggressive designs have flutes with knife-edges that are offset to one another and overlap in the shear zone area. This design, however, lacks the benefit of having detachable flutes. Furthermore, although opposing flutes overlap, they are not sufficiently adjacent one another during stalk shear so as to aggressively mutilate the stalk as well as prevent stalk slippage.

SUMMARY OF THE INVENTION

It is an object of the invention to provide an improved stalk roll for a corn harvesting machine.

It is another object to provide an improved stalk roll having bilaterally symmetric flutes with knife edges which are adjacent and overlap in the shear zone area.

It is still another objective to provide an improved stalk roll of the aforedescribed character that has detachable flutes.

Still another object is to provide an improved stalk roll embodying a more robust construction than heretofore known.

Yet another object is to provide an improved method of removing corn ears from stalks during harvesting.

BRIEF DESCRIPTION OF THE DRAWINGS

This invention including its construction and method of operation is shown more or less diagrammatically in the drawings in which.

DESCRIPTION OF THE PREFERRED EMBODIMENTS

Figure 1:
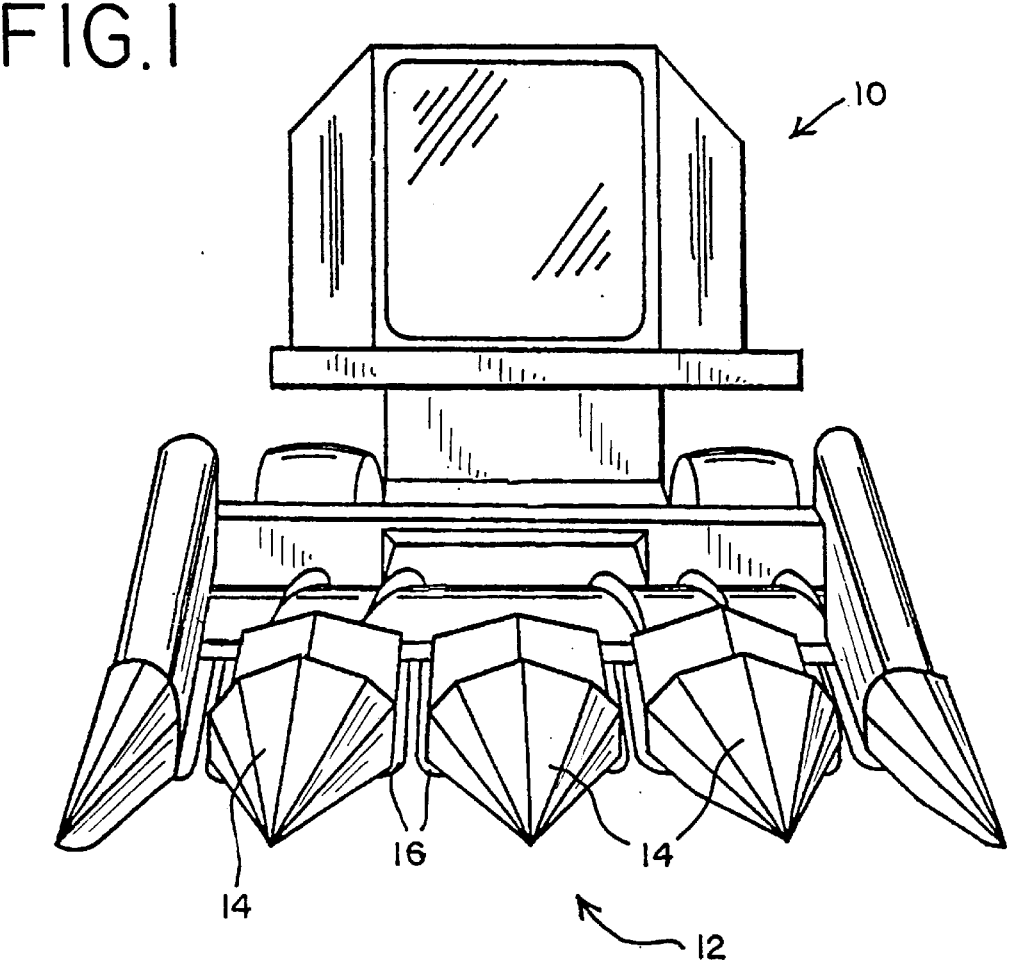
FIG. 1 is a frontal view of a corn-harvesting combine with a set of header attachments according to the present invention.

Referring now to FIG. 1, a corn-harvesting combine 10 is shown having a corn harvesting attachment 12. The harvesting attachment 12 has a plurality of row units 14 with pairs or sets of stalk rolls 16 therebetween.

Figure 2:
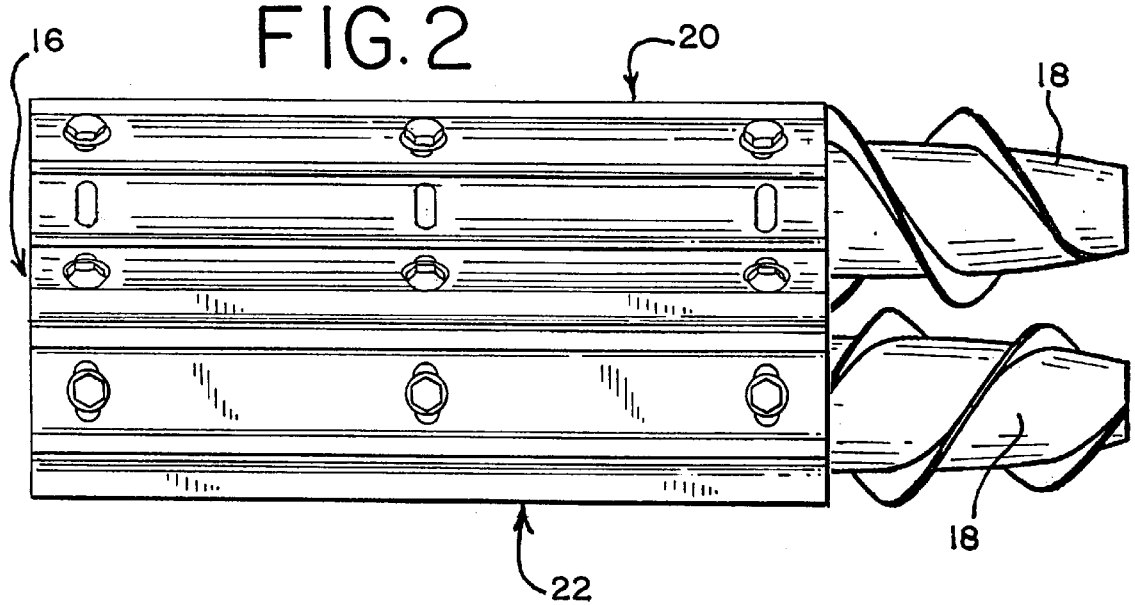
FIG. 2 is a top view of a header stalk roll set for a corn harvesting combine according to the present invention.

As shown in FIG. 2, each stalk roll set 16 has a first and second stalk roll, 20 and 22 respectively. Each stalk roll, 20 and 22, has an impeller 18 at one end. The impellers 18 cooperate to draw corn stalks into the stalk rolls, 20 and 22, as is known in the art.

Figure 3:
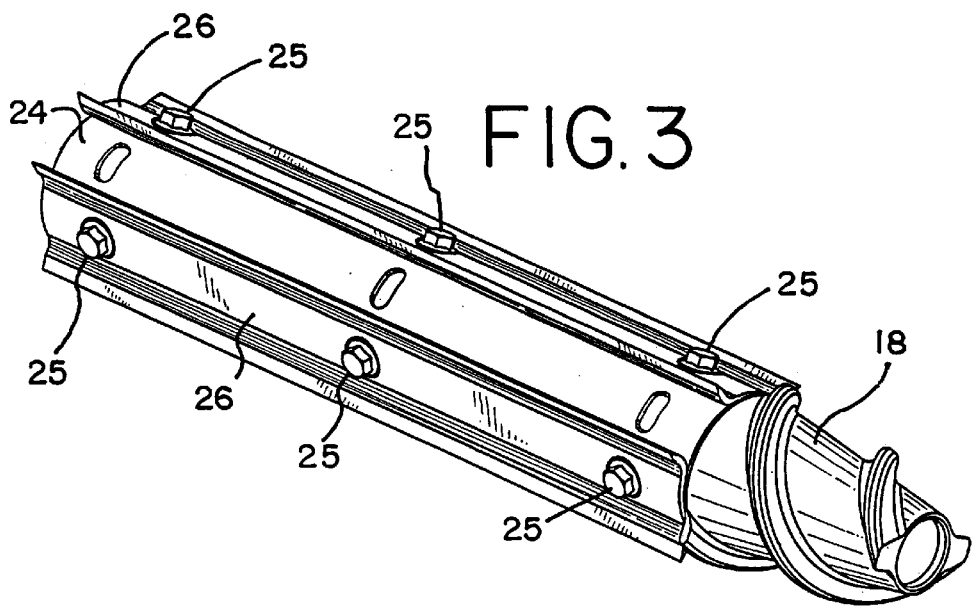
FIG. 3 is a perspective view of a single stalk roll according to the present invention.
Figure 4:
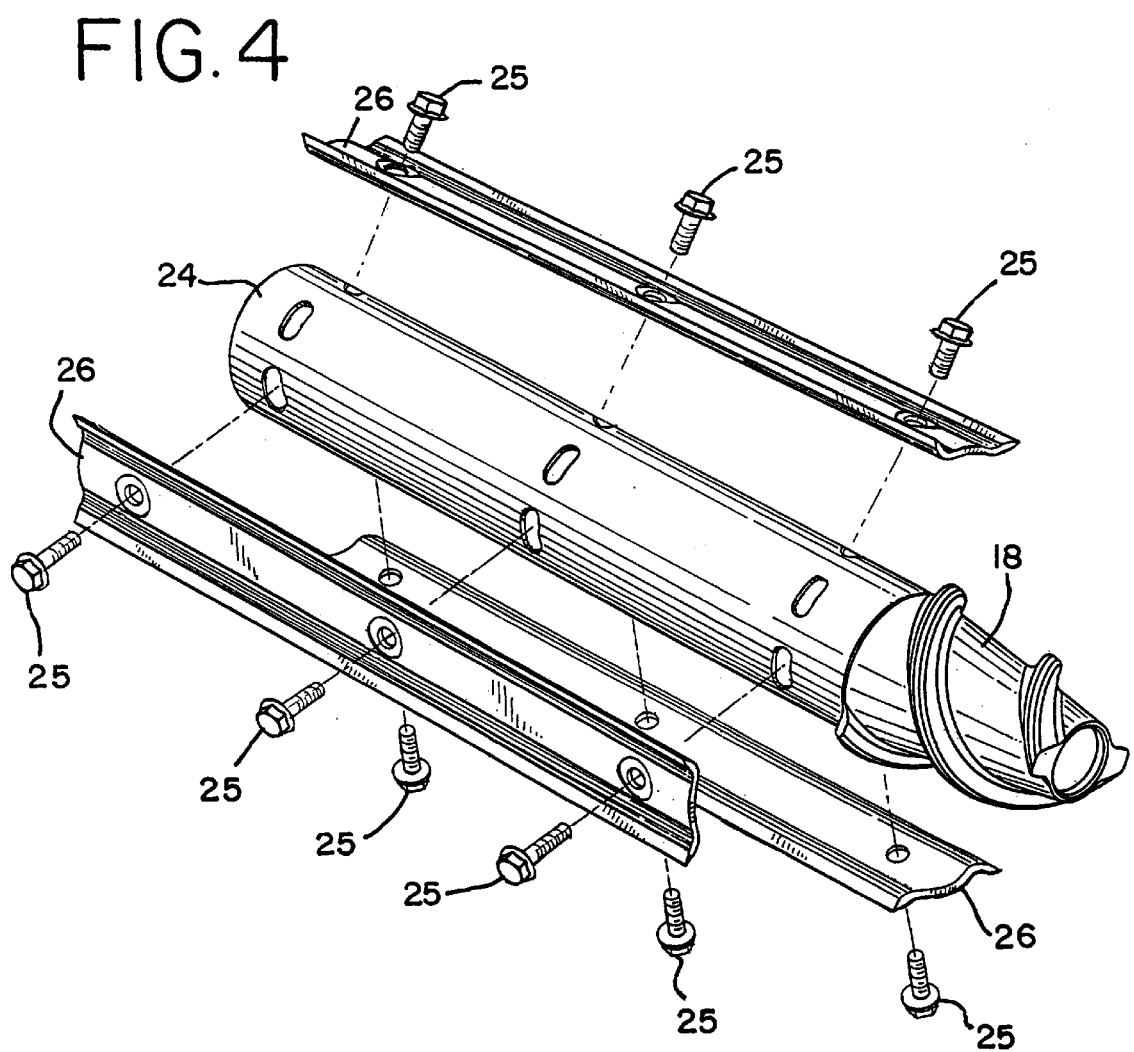
FIG. 4 is a perspective exploded view of a single stalk roll according to the present invention.

As shown in FIGS. 3 and 4, each roll includes a cylindrical stalk tube 24 and a plurality of stalk knives 26 extending longitudinally of the stalk tube 24, and attached to the tube with a plurality of bolts 25. Removably attaching the knives 26 to the cylinder 24 in such fashion advantageously allows for easy replacement of the knives 26 should they become broken or worn.

Figure 5:
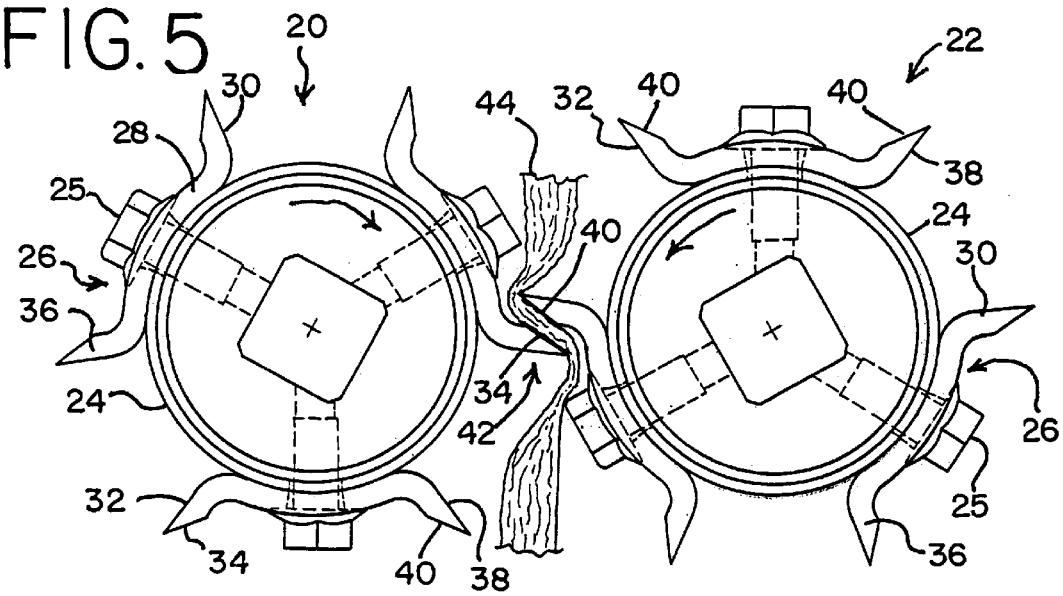
FIG. 5 is an end view of a first roll, leading flute adjacent a second roll, trailing flute in the shear zone.
Figure 6:
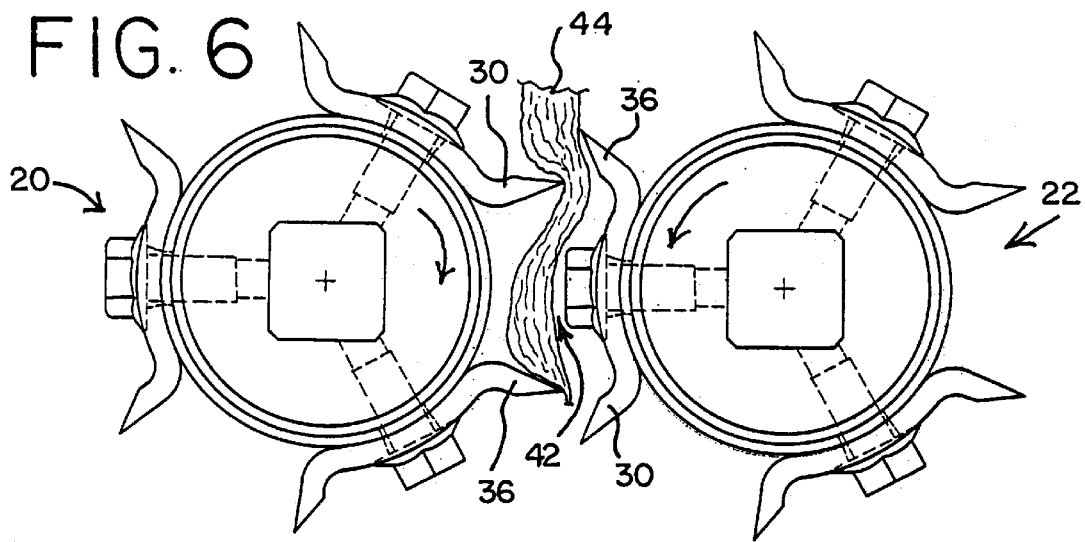
FIG. 6 is an end view of a first pair of offset flutes moving out of and a second pair of offset flutes moving into the shear zone.
Figure 7:
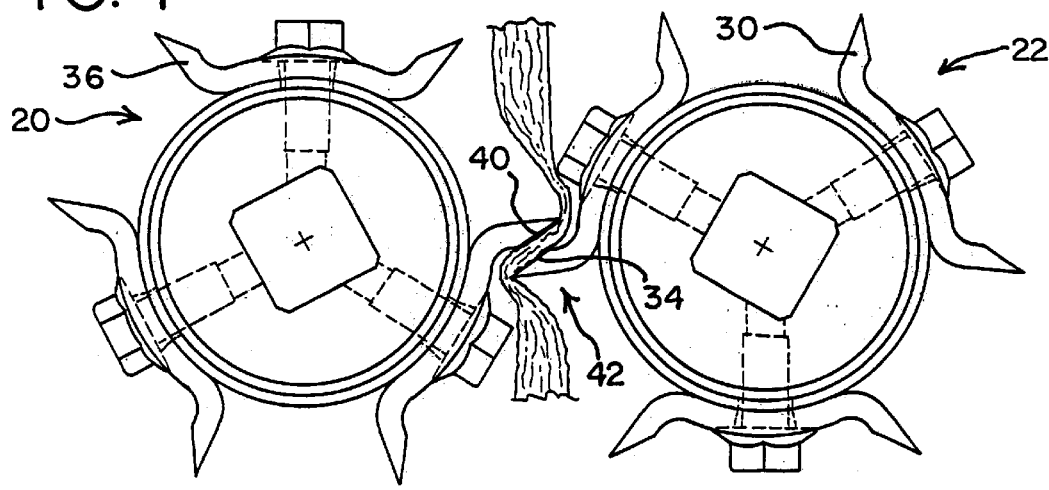
FIG. 7 is an end view of a first roll, trailing flute adjacent a second roll, leading flute in the shear zone.

As shown in FIGS. 5–7, each stalk roll set has a shear zone 42 therebetween. The rolls in each set preferably rotate counter each other about coresponding longitudinal axes. For example, the first roll 20 preferably rotates clockwise about its axis while the second roll 22 rotates counterclockwise about its axis. Such counter rotational movement of the rolls, 20 and 22, creates a downward drawing action in the shear zone 42.

As further shown in FIGS. 5–7, each stalk knife 26 is bilaterally symmetrical about its longitudinal centerline, which extends through the axis of each bolt 25. More specifically, the portions of each knife 26 on opposite sides of the centerline are mirror images of each other. Each knife 26 includes a base 28 with a curvilinear profile that is adapted to partially encircle the cylindrical tube 24 when the knife 26 is attached thereto. A plurality of knives 26, preferably three, is equally spaced circumferentially about the tube 24. A pair of flutes, 30 and 36, projecting from lateral ends thereof. Each pair includes a leading flute 30 and a trailing flute 36.

More specifically, a leading flute 30 is first to be rotated into the shear zone 42 during rotation of a corresponding stalk roll 20 or 22 while the trailing flute 36 is the last to be rotated into the shear zone 42. Each leading flute 30 has a leading surface 32 extending radially with respect to the tube 24 and a trailing surface 34 angled with respect to the leading surface 32. The angle formed between the leading surface 32 and the trailing surface 34 is preferably acute. Each trailing flute 36 has a trailing surface 38 extending radially with respect to the tube 24 and a leading surface 40 angled with respect to the trailing surface 38. The angle formed between the trailing surface 38 and the leading surface 40 is preferably acute.

In use, as also shown in FIG. 5, flutes on opposed rolls 20 and 22 cooperate to engage and, more specifically, pull a stalk 44 in a downward direction. Preferably, when a leading flute 30 of the first stalk roll 20 is rotated into the shear zone 42, a trailing flute 36 of the second stalk roll 22 is simultaneously rotated into the shear zone 42. The leading flute 30 is substantially adjacent and overlapping the trailing flute 36, which advantageously creates a scissor or shearing action. More specifically, at a predetermined point in the shear zone 42, the angled trailing surface 34 of the leading flute 30 is substantially adjacent and parallel to, as well as overlapping, the angled leading surface 40 of the trailing flute 36. Such a relationship in the shear zone 42 of opposing flutes aggressively mutilates the stalk 44.

As shown in FIG. 6, a trailing flute 36 of the first roll 20 and a leading flute 30 of the second roll 22 are releasing the stalk 44 at a point beneath the shear zone 42. Simultaneously with such release, the leading flute 30 of the first roll 20 and the trailing flute 36 of the second roll 22 are engaging the stalk 44 at a point above the shear zone 42. Upon such engagement the stalk 44 is pulled downward into the shear zone 42. Preferably the stalk 44 is never completely released by the rolls, 20 and 22, until after the ear of corn is removed therefrom.

FIG. 7 shows a shear event opposite to the event shown in FIG. 5. More specifically, a trailing surface 34 of a leading flute 30 of the second stalk roll 22 is substantially overlapping and adjacent a leading surface 40 of a trailing flute 36 of the first stalk roll 20 in the shear zone 42. The counter-rotating rolls, 20 and 22, alternate between stalk engagement events shown in FIGS. 5 and 7, thereby drawing the stalk 44 downward to facilitate ear removal while simultaneously aggressively mutilating the stalk 44.

While the preferred embodiments of the present invention have been described, it should be understood that various changes, adaptations and modifications might be made without departing from the spirit of the invention and the scope of the appended claims.

What is claimed is:

1. A stalk roll for a corn-harvesting combine, the stalk roll comprising:
   a) a tube having an axis of rotation;
   b) a first and second flute each projecting substantially radially from the tube and each including a knife edge with a leading surface and a trailing surface forming an acute angle therebetween; and
   c) wherein the leading surface of the first flute projects substantially radially from the tube and the trailing surface is angled with respect to the leading surface and the trailing surface of the second flute projects substantially radially from the tube and the leading surface is angled with respect to the trailing surface.

2. The stalk roll according to claim 1 wherein the tube is cylindrical.

3. The stalk roll according to claim 2 wherein the at least one pair of first and second flutes projects from a base that is detachably mounted to the cylindrical tube.

4. The stalk roll according to claim 3 wherein the base has a curvilinear profile that is adapted to partially encircle the cylindrical tube, the base including a pair of first and second flutes projecting from lateral extremities thereof.

5. The stalk roll according to claim 4 wherein the cylindrical tube has a plurality of said stalk knives detachably mounted thereto and equally spaced thereabout.

6. A method of counter rotationally engaging a stalk roll set for a corn harvesting header, the stalk roll set including a first and second roll defining a shear zone therebetween wherein each roll has a plurality of pairs of flutes projecting therefrom, each pair having a first flute with a radially extending leading surface and a trailing surface angled with respect thereto and a second flute with a radially extending trailing surface and a leading surface angled with respect thereto, the method comprising the steps of:
   a) rotating an angled trailing surface of a first flute of a first roll into the shear zone;
   b) counter-rotating an angled leading surface of a second flute of a second roll into the shear zone, whereby the angled trailing surface of the first flute of the first roll is adjacent the angled leading surface of the second flute of the second roll in the shear zone;
   c) rotating successively an angled leading surface of a second flute of a first roll into the shear zone; and
   d) counter-rotating an angled trailing surface of a first flute of a second roll into the shear zone, whereby the angled leading surface of the second flute of the first roll is adjacent the angled trailing surface of the first flute of the second roll in the shear zone.

7. A stalk roll for a corn harvesting combine, the stalk roll comprising:
   a) a tube having an axis of rotation;
   b) a stalk knife on said tube and extending longitudinally thereof;
   c) said stalk knife including a pair of flutes projecting outwardly from said tube with respect to the axis of rotation, the pair of flutes being bilaterally symmetrical;

d) one of said flutes having a leading surface extending radially from said tube with respect to said axis and a trailing surface angled with respect to said leading surface of said one flute;

e) the other of said flutes having a trailing surface extending radially from said tube with respect to said axis and a leading surface angled with respect to said trailing surface of said other flute;

f) said leading and trailing surfaces on each of said flutes forming an acute angle therebetween.

8. A stalk roll set for a corn-harvesting combine, the stalk roll set comprising:

a) a first tube having an axis of rotation;

b) a second tube having an axis of rotation;

c) at least one pair of flutes comprising first and second flutes projecting radially from each tube with respect to a corresponding axis of rotation, the pair of flutes on each tube being bilaterally symmetrical and each including a knife edge with a leading surface and a trailing surface forming an acute angle therebetween;

d) said first flute in each pair having a leading surface extending radially from the tube and a trailing surface angled with respect to its trailing surface;

e) said second flute in each pair flutes having a trailing surface extending radially from the tube and a leading surface angled with respect to its trailing surface;

said first tube being adjacent and parallel to said second tube so that a shear zone is defined between the tubes and the flutes of adjoining rolls overlap in that zone.

9. The stalk roll set according to claim 8 wherein an angled trailing surface of a first flute of a first tube is adjacent an angled leading surface of a second flute of a second tube when counter-rotationally engaged in the shear zone.

10. The stalk roll set according to claim 8 wherein an angled leading surface of a second flute of a first tube is adjacent an angled trailing surface of a first flute of a second tube when counter-rotationally engaged in the shear zone.

11. A stalk roll for a corn harvesting machine, the stalk roll comprising:

a) a tube having an axis of rotation and adapted to rotate in a predetermined direction;

b) a stalk knife extending longitudinally of said tube and releasably fastened to its outer periphery;

c) said stalk knife including a base seated on said outer periphery and first and second flutes bracketing said base;

d) said first and second flutes being bilaterally symmetrical relative to said base;

e) each of said flutes having a knife edge defined by leading and trailing surfaces.

12. The stalk roll according to claim 11 wherein:

a) said first flute has a leading surface and a trailing surface, said leading surface lying substantially on a radius of said tube; and b) said second flute has a leading surface and a trailing surface, said trailing surface lying substantially on a radius of said tube.

13. The stalk roll according to claim 12 wherein:

a) an acute angle is formed between the leading and trailing surface of each of said flutes.

* * * * *